(No Model.)
J. H. DUNBAR.
ICE CRUSHER.
No. 342,289. Patented May 18, 1886.
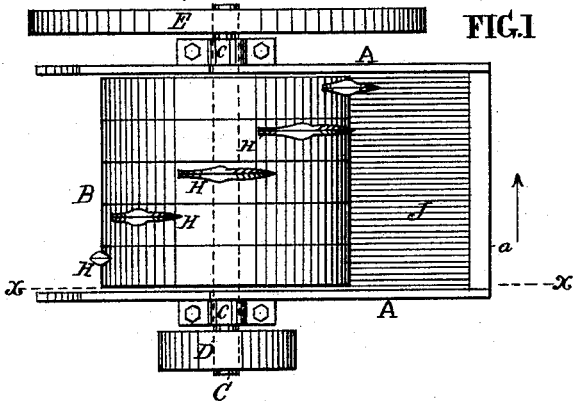
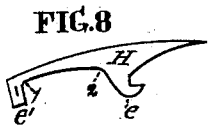
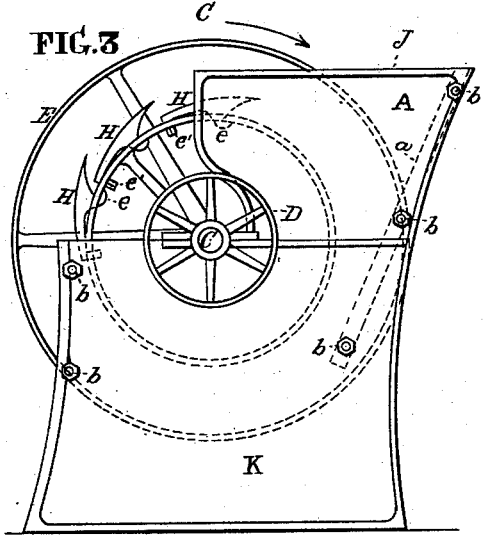
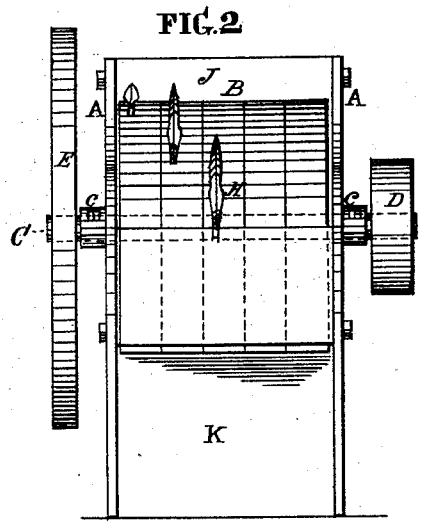
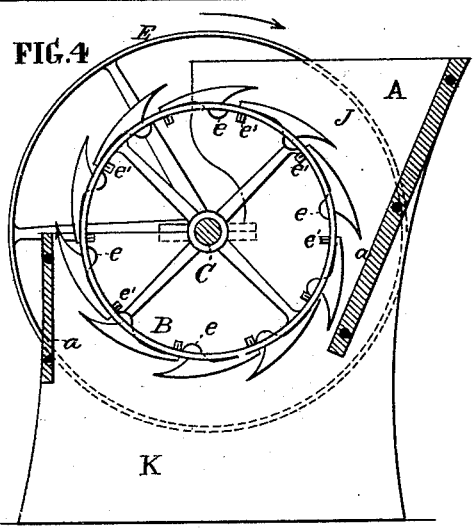
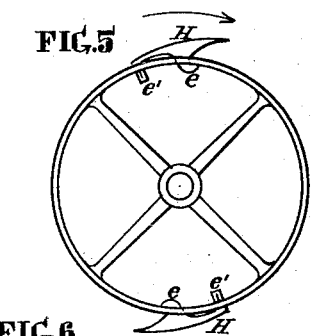
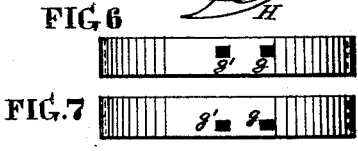
Witnesses.
S. E. W. Bewley.
C. M. Edwards.
Inventor
John H. Dunbar.
per Thomas J. Bewley, Atty.

UNITED STATES PATENT OFFICE.

JOHN H. DUNBAR, OF PHILADELPHIA, PENNSYLVANIA, ASSIGNOR TO CLEMENT & DUNBAR, OF SAME PLACE.

ICE-CRUSHER.

SPECIFICATION forming part of Letters Patent No. 342,289, dated May 18, 1886.

Application filed March 23, 1886. Serial No. 196,302. (No model.)

*To all whom it may concern:*

Be it known that I, JOHN H. DUNBAR, a citizen of the United States, residing at Philadelphia, in the county of Philadelphia and State of Pennsylvania, have invented certain new and useful Improvements in Ice-Breaking Machines, of which the following is a specification.

My invention has for its object the rigid attachment to the surface of a cylinder, supported in suitable bearings of a standing frame, of a series of hooked teeth or picks for reducing blocks of ice to fragments in such a manner that the teeth may be readily attached or detached.

My invention consists in providing the cylinder of an ice-breaking machine with a series of teeth or picks having hooked or curved projecting exposed ends extending outwardly from the periphery of the cylinder, which, during its revolutions, when motion is imparted thereto, carries the series of teeth successively into contact with blocks of ice fed into a hopper, tearing, crushing, and reducing said blocks to fragments. The teeth are rigidly secured to the cylinder by a pair of lugs projected from their under surfaces, that are caused to engage within orifices formed to receive them, the forward lug being recessed or hooked to lock within its connected orifice, while the rear lug is pushed or forced into its seat and confined upon the inner surface of the cylinder by means of a slip pin, nut, or key, which is caused to slightly draw the lug down, thus binding the tooth rigidly upon the cylinder. This cylinder is composed of a series of rimmed wheels, formed like belt-pulleys, provided with spokes or arms, and a bored central hub for connection with the driving-shaft, and is so constructed in order that the orifices in the rims of said wheels may be cored out when cast to obviate the expense of boring, and also to permit of their arrangement upon the shaft in such a manner that the teeth shall follow each other at equidistant intervals around the periphery, as well as horizontally across the face of the cylinder, in order that during the operation of the machine a successive series of blows from the picks is caused to be inflicted upon the ice the entire width of the hopper.

In the accompanying drawings, which make a part of this specification, Figure 1 is a plan view of my improved machine. Fig. 2 is an end view taken from the rear. Fig. 3 is a side elevation. Fig. 4 is a vertical section taken through the broken line $x\,x$ of Fig. 1. Fig. 5 is a side view of one of the sections that form the cylinder. Figs. 6 and 7 are face views showing opposite halves of the periphery of a section. Fig. 8 is a side view of one of the picks detached on an enlarged scale.

Like letters of reference in all the figures indicate the same parts.

A A are the housings or standing frame of the machine, separated by the cross-plates $a$, and confined therewith by the bolts $b$.

B is the cylinder upon the driving-shaft C, which has bearings in the boxes $c$ upon the exterior surfaces of the housings.

D is a pulley on one end of the shaft C. A belt connected with motive power in practice passes over it to revolve the cylinder. E is a fly-wheel upon the other end of said shaft for the customary purpose.

The cylinder is composed of a series of sections, each provided with arms and a central hub for connection with the driving-shaft. Each section has a pair of projecting teeth secured upon the periphery of its rim, placed equidistant or directly opposite each other. These hooked or curved end teeth or picks, H, are cast with a pair of lugs, $e\,e'$, projected from their under surfaces, that engage with the orifices $g\,g'$ (see Figs. 6 and 7) of the rim of the section. The lug $e$ is recessed or slotted across its face, whereby it is caused to hook under the metal of the rim forming the front edge of the orifice $g$, while the lug $e'$ is forced into the orifice $g'$, drawn down, and held within the rim by means of a nut connected with a screw-thread upon its end or by means of a key or pin. The curvature of line of the under surfaces of the teeth or picks between the points 1 and 2 (see Fig. 8) being less than the exterior surfaces of the rims of the sections, there is consequently a space formed, whereby said teeth are caused to hug the cylinder only upon the hook of the lug $e$, the point 2, and pin or key of the lug $e'$, whereby they can be rigidly secured thereon by merely tightening the nut or key, which acts with a leverage force upon said lug. This mode of attachment permits of an expeditious removal of the teeth that may become broken and an easy attachment of new.

The cylinder is composed of sections, in order that the orifices $g\ g'$ may be cored in casting to save expense in boring, and also to permit of such an adjustment upon the shaft that the series of teeth upon the combined sections may be so arranged at equidistant points around the periphery, as well as from each other across the face of the cylinder, that they follow each other at equal intervals of time when rotated, and inflict a constant succession of blows upon the ice the entire width of the hopper.

The operation is as follows: Power by a belt or crank being communicated to the pulley D, it revolves, carrying with it the shaft C and its cylinder B, (in the direction of the arrow,) which successively brings the projecting points of the teeth or picks H into contact with the blocks of ice fed into the hopper J, drawing downward, tearing and crushing said blocks into fragments, which fall into the pit K, ready to be removed for use.

I claim as my invention and desire to secure by Letters Patent—

1. In an ice-breaking machine, the combination, with a rotating cylinder, D, of picks or teeth H, formed with a hook, $e$, and lug $e'$, which are caused to engage with the cylinder through the orifices $g\ g'$, the lug $e'$ being provided with a nut, key, or pin upon its end, substantially as herein shown and described, for the purpose set forth.

2. In an ice-breaking machine, the combination, with the standing frame A, of a series of sections forming the cylinder, provided with picks or teeth H, at equidistant points around the periphery and across the face of said cylinder, substantially in the manner herein described, for the purpose set forth.

JOHN H. DUNBAR.

Witnesses:
THOMAS J. BEWLEY,
C. M. EDWARDS.